(12) United States Patent
Farrell et al.

(10) Patent No.: US 9,886,507 B2
(45) Date of Patent: Feb. 6, 2018

(54) RERANKING SEARCH RESULTS USING DOWNLOAD TIME TOLERANCE

(71) Applicant: International Business Machines Corporation, Armonk, NY (US)

(72) Inventors: Robert G. Farrell, Cornwall, NY (US); Youngja Park, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 14/265,398

(22) Filed: Apr. 30, 2014

(65) Prior Publication Data

US 2015/0317309 A1 Nov. 5, 2015

(51) Int. Cl.
*G06F 7/00* (2006.01)
*G06F 17/30* (2006.01)

(52) U.S. Cl.
CPC .... *G06F 17/30864* (2013.01); *G06F 17/3053* (2013.01)

(58) Field of Classification Search
None
See application file for complete search history.

(56) References Cited

U.S. PATENT DOCUMENTS

| | | | |
|---|---|---|---|
| 6,725,259 B1 | 4/2004 | Bharat | |
| 6,801,906 B1 | 10/2004 | Bates et al. | |
| 7,574,436 B2 | 8/2009 | Kapur et al. | |
| 7,827,170 B1* | 11/2010 | Horling | G06F 17/30867 707/722 |
| 8,082,246 B2 | 12/2011 | Meyerzon et al. | |
| 2006/0106793 A1* | 5/2006 | Liang | G06F 17/30654 |
| 2007/0214131 A1 | 9/2007 | Cucerzan et al. | |
| 2007/0299869 A1* | 12/2007 | Clary | G06F 11/3452 |
| 2010/0057714 A1 | 3/2010 | Miedema | |
| 2012/0330948 A1 | 12/2012 | Rault et al. | |

OTHER PUBLICATIONS

Nah, "A Study on Tolerable Waiting Time: How Long are Web Users Willing to Wait?", (2004), Behaviour & Information Technology, forthcoming, pp. 1-37.
Posted by Zoompf to Web Design, "How Website Speed Actually Impacts Search Ranking", The Moz Blog, Accessed on Apr. 3, 2014, http://moz.com/blog/how-website-speed-actually-impacts-search-ranking, pp. 1-32.

\* cited by examiner

*Primary Examiner* — Thu Nga Nguyen
(74) *Attorney, Agent, or Firm* — Michael A. Petrocelli (57) ABSTRACT

A method and system for ranking query results on an electronic device includes the steps of obtaining a plurality of search results using a computer based on a query initiated by a user using a communications device. A ranking is determined of the search results based on a ranking technique using the computer. The ranking technique is based on a download tolerance factor and a predicted download time of data for viewing by the user for each of the search results. The search results are ranked and sent to the communications device for display to the user.

14 Claims, 4 Drawing Sheets

RERANKING SEARCH RESULTS USING DOWNLOAD TIME TOLERANCE

BACKGROUND

Field

The present disclosure relates to a method and system for re-ranking query results on an electronic device.

Background of the Disclosure

Information retrieval systems can include typical search engines accessed using an electronic device such as a computer, personal data assistant (PDA) or the like. For example, an electronic device can access information stored on a remote server using a web browser, search engine, or a search client. The search engines can rank the search results or documents (or other digital media) returned from the search. The ranking can be based on several factors, including topical relevance to the query, location associated with query, or personal profile, etc. Existing search solutions and results, however, are primarily designed for non-mobile searches such as from desktop computers. With a rapidly growing number of mobile device users, more and more search requests come from mobile devices of users/people only temporarily at a location or in transit. The mobile and transient nature of users can result in connectivity issues, and challenging download issues such as changing download speeds at the user's current location or as the user moves between locations.

SUMMARY

Users on the go may be traveling to a specific location or only have a fixed time to get an answer from the search. Users may not be able to use large documents and data while on the go. Users who are mobile may be more impatient because of their usage pattern with mobile devices, preferring to get a quick answer and then put the device away. Furthermore, balancing the need for quick download and relevancy can be difficult for users and search results are presented in pages so that search results that download quickly enough to be useful may appear on a different page, especially on the small display of many mobile devices.

A user's requirements or preferences for search results can be different when they use mobile devices as compared to using non-mobile devices. For instance, a user can have resource restrictions including slower connectivity and limited download allowance. Additionally, a user may want to receive search results more quickly than in non-mobile situations because the user is in transit to a location. Therefore, in some situations, a less relevant download, e.g., document, may be preferable if it can be downloaded faster to present the user with a result. Such issues may explain mobile users frequently starting and then aborting downloads, because they become frustrated reading through the search results to find a document that will load fast enough for their situation or preference. Thus, it would be desirable, for example, to provide a method of ranking search results that accounts for the users' resource restrictions, and their tolerance for download time, whether by necessity or preference.

According to an aspect of the invention, a method for ranking query results on an electronic device includes obtaining a plurality of search results using a computer based on a query initiated by a user using a communications device being configured to send and receive electronic communications. The method includes determining a ranking of the search results based on a ranking technique using the computer, and the ranking technique is based on a download tolerance factor and a predicted download time of data for viewing by the user for each of the search results. The method further includes sending the ranking of the search results to the communications device for display to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
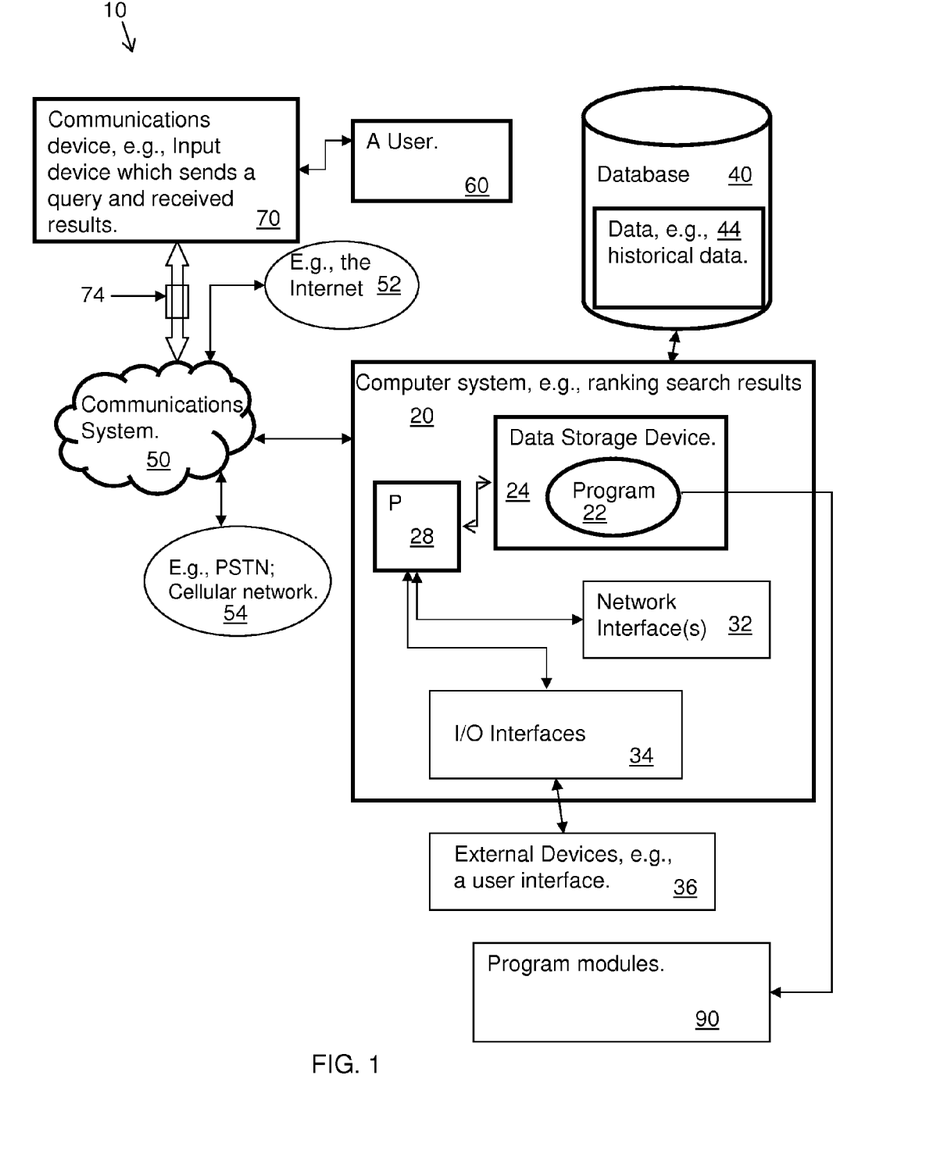
FIG. 1 is a schematic block diagram illustrating an overview of the system and methodology for re-ranking query results on an electronic device according to an embodiment of the disclosure.
Figure 2:
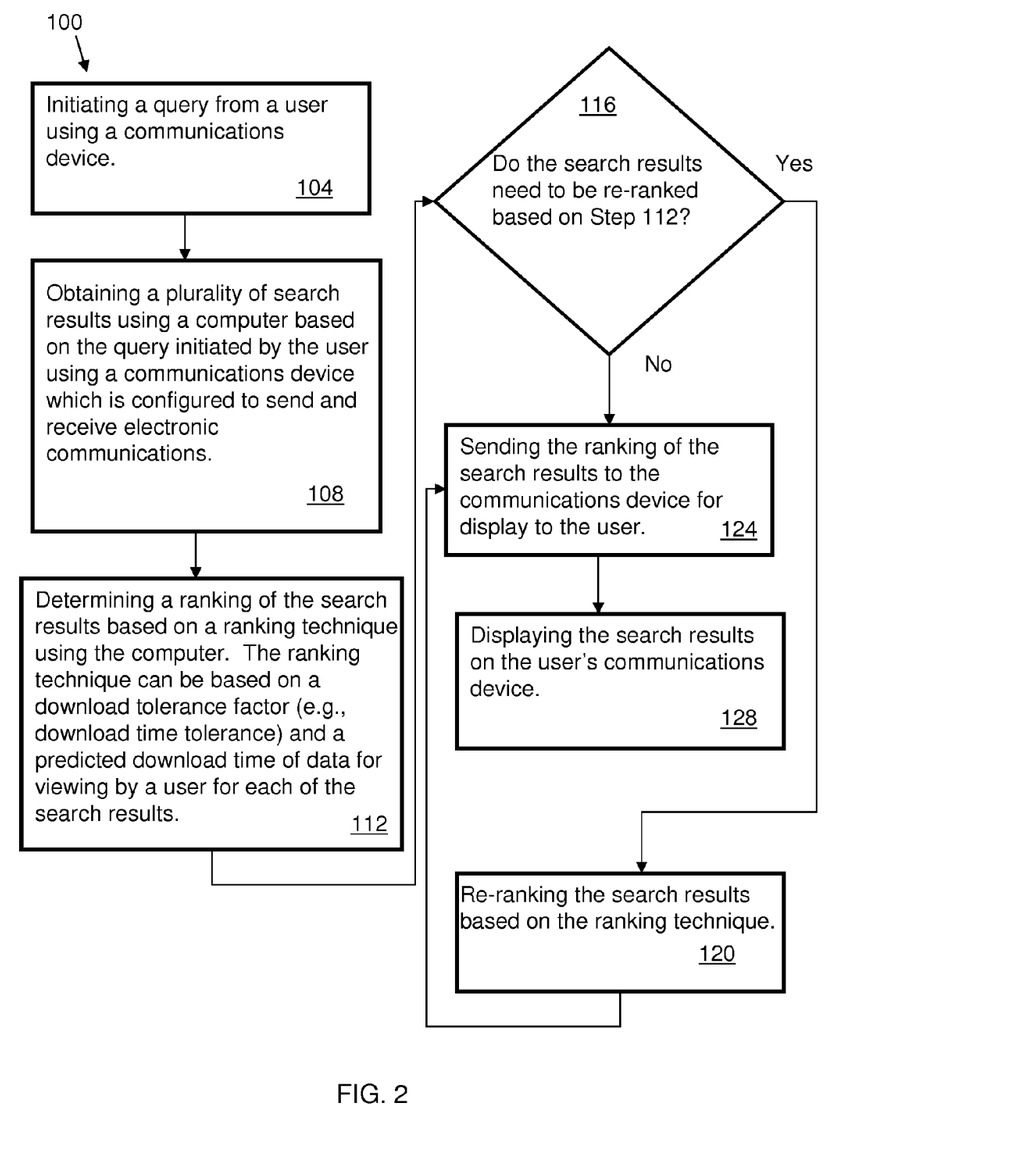
FIG. 2 is a flow chart illustrating a method for re-ranking query results on an electronic device according to an embodiment of the disclosure.

Referring to FIGS. 1 and 2, a system 10 and method 100, according to an embodiment of the disclosure, for ranking query results on an electronic device includes components shown in FIG. 1. The system 10 includes a communications device 70 as a generic representation for one of a plurality of user devices, for example, a computer, or a Personal Data Assistant (PDA), a cell phone, a notebook, or the like. The user device 70 is configured to send and receive electronic communications. The method 100 includes initiating a query 74 from a user 60 using a communications device, for example, the device 70, as in step 104. For example, a web search using a search engine 210 (FIG. 4) may be initiated by the user, and a list of web pages shown on the device. The user can then select a link to one of the webpages and download the webpage to the device for viewing. Step 108 includes obtaining a plurality of search results 204 (FIG. 4) using a computer, embodied as computer 20 in FIG. 1, in response to the query initiated by the user using a communications device which is configured to send and receive electronic communications. The search results can include one or more documents, video files, and/or audio files.

The method 100 may be provided as part of a service or may be embodied in a program 22 embodied on a computer readable storage device, e.g., a data storage device 24, which is executable by a processor 28 (i.e., executable program steps, code, or program code) of a computer or computer system 20. The computer 20 is a generic representation of a computer which may be embodied in a communications device such as a hand held device, or could represent a server for providing the method as a service which can be accessible using the Internet, and can run as an addition to a search engine. The program or executable instructions therefrom, may be offered as a service by a provider. Also, the program may be stored and run locally on the user device. The computer system 20 communicates with a database 40 wherein data 44 can be stored. The data 44 can include personal preferences, such as a download historical data. The computer system 20 can include a network interface 32, and input/output (I/O) interface(s) 34. The I/O interface 34 allows for input and output of data with an external device 36 that may be connected to the computing device. The network interface 32 may provide communications between the computing device and a computer network.

The program 22 may include program modules 90 for executing specific steps, routines, sub-routines, instructions or code, of the program. Such modules 90 are generically represented in FIG. 1.

In one example, the query 74 may be sent from the device 70 using a search engine program to access a search engine. The search engine program may run within a web browser and access the search engine over the Web (World Wide Web). The device may be a mobile smartphone capable of running the web browser which uses a communications system 50 which can include the Internet 52, or a public switched telephone network (PSTN) for example, a cellular network 54. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Figure 4:
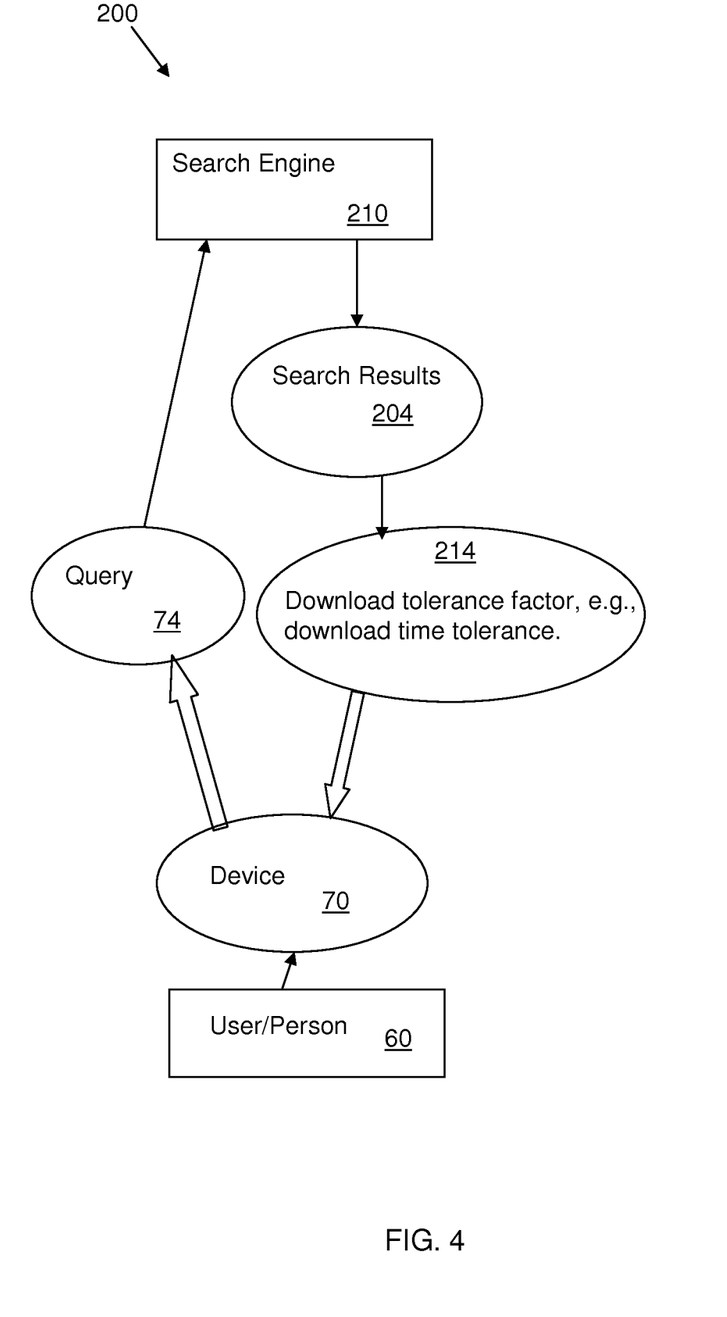
FIG. 4 is a functional block diagram according to an embodiment of the disclosure which depicts the functional flow of the system and method shown in FIGS. 1 and 2.

Step 112 includes determining a ranking of the search results based on a ranking technique. The ranking technique can be based on a download tolerance factor 214 (FIG. 4). The download tolerance factor can be based on wait times for downloads to the communications device. The download tolerance factor can be a download time tolerance (or wait time) based on an average time the user has waited in the past for downloads to the communications device. The download time tolerance can be a predicted download time of data for viewing by a user for each of the search results. The download time tolerance can include determining a user's tolerance for waiting for a download of selected information, e.g., how long a user will wait for data to download after selecting a website or a link to a website. The user can set a tolerance factor time (which can also be referred to as a tolerance time or time period), for example, 3 seconds, or a generic time period can be set. The user is willing to wait for 3 seconds for the document to download. Also, a tolerance factor time can be automatically determined from past behavior of the user. For example, if the user has on the average waiting 2 seconds after selecting a website link, before selecting another website link, their tolerance factor time can be 2 seconds or the average time they wait before selecting another website link.

Other tolerance factors can include file size tolerance, or a lack of tolerance for downloading attachments.

In another example, the user may have an actual deadline by which to get information that determines the download time by necessity. For example, a train may be arriving in two minutes and the information regarding alternate trains needs to be viewed before that deadline. Similarly, the user may be traveling and arriving at a destination in five minutes (this could be determined by velocity and distance to a destination), thus download times longer than a minute or two might be unacceptable.

In one embodiment, a user interface for a search engine program may be modified to compute an estimated deadline, or to allow the user to input their download time tolerance, or allow for the user to override an estimate with their input. This download time tolerance can apply across several queries. Several tolerance times can also be stored for the user's selection.

One technique to determine a download tolerance time is to detect when a user selects a search result, and then aborts the download or switches their selection to another document, or starts a new search, aborts searching altogether or starts another application. This information can be used to estimate a download tolerance time by using the amount of time between a search result being displayed to the user, and the user changing selections (a wait time). In one embodiment, the download tolerance time can be different for each of several types of file downloads. For instance, each file type, such as, a document, a webpage, a video or an audio file, can have an associated download tolerance time. In another embodiment, the tolerance times can be based on the context of the user when performing the search. For example, a sensor on the mobile phone the user is using might detect movement. When the user is moving, their download tolerance may be shorter than when the user is not moving. Thus, multiple contexts, each with a download tolerance time, can be maintained and selected when the user is in one or more contexts. Other examples of context include a location (e.g., work vs. not at work), a time period (after hours vs. work hours), or an activity (e.g., exercising vs. not exercising). The system can keep a history of times associated with changing selections and combine them. e.g., averages over a fixed period, e.g., 90 days, to determine the download tolerance times for multiple contexts and file types, and store the history in the database 40 as data 44.

Step 116 includes determining if the search results need to be re-ranked based on the ranking technique of step 112. When the search results need to be re-ranked, the method goes to step 120 and re-ranks the search results based on the ranking technique. The method then advances to step 124 to present the search results to the user on the user's device, that is, the re-re-ranked search results. When the search results do not need to be re-ranked, the method 100 advances to Step 124 from step 116, and presents the search results obtained in step 108.

Step 128 includes displaying the search results on the user's communication device, that is, on a display of the communications device. For example, search results can be displayed similarly to ranking items based on title, author, size, or other metadata, or portions of the content or a summary. The re-ranked search results may include numbers that indicate the original ranking. For example, if the re-ranking swaps the first search result and the second search result, then the first search result could be numbered as second and the second search result could be numbered as first.

Figure 3:
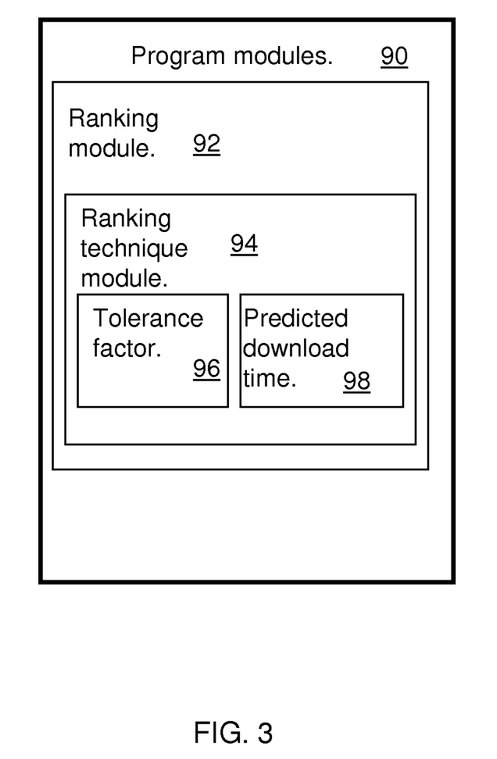
FIG. 3 is a detailed schematic block diagram of the program modules shown in FIG. 1.

The program 22 may include program modules 90 for executing specific steps, routines, sub-routines, instructions or code, of the program. Such modules 90 are generically represented in FIG. 1, and shown in more detail in FIG. 3. Referring to FIG. 3, a ranking module 92 ranks the search results using a ranking technique module 94. The ranking technique is described in detail above, and in the embodiment of the disclosure described herein, includes a tolerance factor 96 (e.g., a download time tolerance), and a predicted download time 98.

Further, regarding the ranking technique of step 112, the ranking technique can include analyzing a relevancy of the search results in relation to the query, the predicted download time, and the download time tolerance (e.g., download time) to determine the ranking. In this aspect of the disclosure, the ranking technique can rank the search results by relevancy, and then re-rank the search results based on the download time tolerance and the predicted download time. For example, if first and second search results are ranked as such, but it is found that the second search result will download faster or be within a threshold download time tolerance, then the results can be re-ranked wherein the second search result is listed first in the search results.

The file download speed can be estimated by using the file size (e.g., bytes), and the connection speed (e.g., bits per second). Also, caching capabilities, and processor speed can be factors as well. The connection speeds can vary for using a wireless local area network (WiFi), or a mobile telecommunications network, for example, typically the WiFi can provide faster download speeds than the mobile network. The difference in connection or download speed can be considered in addition to the download time tolerance when ranking search results. That is, how the connection speed will affect the download in relation to the download time tolerance in ranking the results.

Thereby, the method and system of the present disclosure provide for re-ranking search results which can be used in mobile devices. The present disclosure also takes into consideration connectivity and download times, which are more relevant for a mobile device user, by determining a download time tolerance and a predicted download time as in step 112 of the method 100. In this situation, a less relevant document can be listed first, or sooner in a list of search result documents. An advantage of the present disclosure is that a user does not have to scroll down a list of search documents, click on and then aborting each one, only to find one that will open within their tolerance time using trial and error, they can select from the list knowing that the method has taken into account both the relevancy and their need for getting the information in time, and thus select from among the first few documents.

Other factors that can be used in determining a ranking of search results, are whether the user has adequate data for the download on their data plan, or if the size of the file makes it unlikely to be useful or difficult to use on the device.

In one embodiment, a system can compute the re-ranking as follows. First, it computes a predicted offset for each search result, as the predicted download time minus the download time tolerance. This divides the search results into a download time tolerated set (positive or zero predicted offset), and a download time not tolerated set (negative predicted offset). The tolerated set can then be sorted by its relevance scores, and the not tolerated set can be sorted by its relevance scores. In this way, the user will first see relevant documents within their download time tolerance. If there are no documents that have a positive or zero predicted offset, then the other set is sorted by a weighted average of a normalized relevancy (also know as the relevance score) for that document and a normalized predicted offset. The normalized relevance can be 0 to 100 with 100 being the most relevant. The normalized predicted offset is determined as a percentage of the longest predicted offset times 100. The normalized relevance and the normalized predicted offset can be averaged to provide the weighted average tolerated relevance score. The documents are then sorted by the tolerated relevance score.

Regarding the displaying of the re-ranked search results, the group of search results that are within the download time tolerance may be grouped or separated from the other search results or distinguished in some way, e.g., by color, font, etc. Thus, directing the user to those search results that are within download time tolerance.

For example, referring (in part) to FIG. 4 depicting a functional flow 200 according to the disclosure, the present method and system can include, the user/person 60 using a search client which can be a web browser on the device 70 to issue a query 74. The query 74 is input into a search engine 210 which outputs the search results 204. Over time, the user/person uses the search client to download the individual search results, (e.g., resources, documents). The download times for accessing the documents with the search client and also whether the user tolerated (e.g., stopped the download using a button on the search client) for each of the downloads, can be stored together in a search history (e.g., data 44 of database 40). An analysis of the search history (e.g., see step 112) averages or uses another function on the recent history within the search history to determine the download tolerance factor 214. The download tolerance factor 214 could also be arrived at in other ways independently of the search history such as by input by the user/person. The re-ranking process (e.g., step 112) can use an input both the search results 204 and the download tolerance factor 214 to re-rank the search results and provide the resulting reordered search results back to the search client, which is directed to the user/person 60.

Referring to FIG. 1, the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A method for ranking query results on an electronic device, comprising:
    obtaining a plurality of search results using a computer based on a query initiated by a user using a communications device being configured to send and receive electronic communications;
    analyzing a relevancy of the search results in relation to the query to determine a first ranking of the search results;
    determining a second ranking of the search results based on the first ranking including the analysis of the relevancy, and a ranking technique using the computer, the ranking technique based on a download tolerance factor and a predicted download time of data for viewing by the user for each of the search results;
    the download tolerance factor including a download time tolerance of the user, the download time tolerance being based on:
        a wait time based on an average time the user waited in the past for downloads to the communications device before the user selected another search result after selecting a first search result; or a selected wait time by the user for the user to wait for a search result to open for viewing on the communications device;

determining the second ranking by re-ranking the first ranking based on the ranking technique including the download tolerance factor; and sending the second ranking of the search results to the communications device for display to the user, and displaying the results on the communications device according to the second ranking.

2. The method of claim 1, wherein the download time tolerance is automatically calculated based on previous data from the user, the previous data including the wait time before the user selected another search result after selecting the first search result.

3. The method of claim 1, further comprising:

displaying the search results on the communications device.

4. A computer program product for ranking query results on an electronic device, the computer program product comprising a computer readable storage medium having program code embodied therewith, the program code being readable/executable by a processor to perform a method, comprising:

obtaining a plurality of search results using a computer based on a query initiated by a user using a communications device being configured to send and receive electronic communications;

analyzing a relevancy of the search results in relation to the query to determine a first ranking of the search results;

determining a second ranking of the search results based on the first ranking including the analysis of the relevancy, and a ranking technique using the computer, the ranking technique based on a download tolerance factor and a predicted download time of data for viewing by the user for each of the search results;

the download tolerance factor including a download time tolerance of the user, the download time tolerance being based on:

a wait time based on an average time the user waited in the past for downloads to the communications device before the user selected another search result after selecting a first search result; or a selected wait time by the user for the user to wait for a search result to open for viewing on the communications device;

determining the second ranking by re-ranking the first ranking based on the ranking technique including the download tolerance factor; and sending the second ranking of the search results to the communications device for display to the user, and displaying the results on the communications device according to the second ranking.

5. The product of claim 4, wherein the download time tolerance is automatically calculated based on previous data from the user, the previous data including the wait time before the user selected another search result after selecting the first search result.

6. The product of claim 4, further comprising:

displaying the search results on the communications device.

7. A system for ranking query results on an electronic device, the system comprising:

a computer system which comprises: a computer processor, a computer-readable storage medium, and program instructions stored on the computer-readable storage medium, being executable by the processor, to cause the computer system to perform a method, comprising:

obtaining a plurality of search results using a computer based on a query initiated by a user using a communications device being configured to send and receive electronic communications;

analyzing a relevancy of the search results in relation to the query to determine a first ranking of the search results;

determining a second ranking of the search results based on the first ranking including the analysis of the relevancy, and a ranking technique using the computer, the ranking technique based on a download tolerance factor and a predicted download time of data for viewing by the user for each of the search results;

the download tolerance factor including a download time tolerance of the user, the download time tolerance being based on:

a wait time based on an average time the user waited in the past for downloads to the communications device before the user selected another search result after selecting a first search result; or a selected wait time by the user for the user to wait for a search result to open for viewing on the communications device;

determining the second ranking by re-ranking the first ranking based on the ranking technique including the download tolerance factor; and sending the second ranking of the search results to the communications device for display to the user, and displaying the results on the communications device according to the second ranking.

8. The system of claim 7, wherein the download time tolerance is automatically calculated based on previous data from the user, the previous data including the wait time before the user selected another search result after selecting the first search result.

9. The method of claim 1, wherein the download tolerance factor includes a plurality of download time tolerances associated with each of a plurality of file types, respectively, the plurality of download time tolerances being based on:

a file type wait time based on an average time the user waited in the past for downloads of one of the plurality of file types to the communications device before the user selected another search result after selecting the first search result; or a selected wait time for each of the file types by the user for the user to wait for the search result to open for viewing on the communications device for one of the plurality of file types.

10. The method of claim 1, wherein the download tolerance factor includes a plurality of download time tolerances associated with each of a plurality of user contexts, respectively, the plurality of download time tolerances being based on:

a context wait time based on an average time the user waited in the past for downloads of one of the plurality of user contexts to the communications device before the user selected another search result after selecting the first search result; or a selected wait time for each of the contexts by the user for the user to wait for the search result to open for viewing on the communications device for one of the plurality of user contexts.

11. The computer program product of claim 4, wherein the download tolerance factor includes a plurality of download time tolerances associated with each of a plurality of file types, respectively, the plurality of download time tolerances being based on:
- a file type wait time based on an average time the user waited in the past for downloads of one of the plurality of file types to the communications device before the user selected another search result after selecting the first search result; or
- a selected wait time for each of the file types by the user for the user to wait for the search result to open for viewing on the communications device for one of the plurality of file types.

12. The computer program product of claim 4, wherein the download tolerance factor includes a plurality of download time tolerances associated with each of a plurality of user contexts, respectively, the plurality of download time tolerances being based on:
- a context wait time based on an average time the user waited in the past for downloads of one of the plurality of user contexts to the communications device before the user selected another search result after selecting the first search result; or
- a selected wait time for each of the contexts by the user for the user to wait for the search result to open for viewing on the communications device for one of the plurality of user contexts.

13. The system of claim 7, wherein the download tolerance factor includes a plurality of download time tolerances associated with each of a plurality of file types, respectively, the plurality of download time tolerances being based on:
- a file type wait time based on an average time the user waited in the past for downloads of one of the plurality of file types to the communications device before the user selected another search result after selecting the first search result; or
- a selected wait time for each of the file types by the user for the user to wait for the search result to open for viewing on the communications device for one of the plurality of file types.

14. The system of claim 7, wherein the download tolerance factor includes a plurality of download time tolerances associated with each of a plurality of user contexts, respectively, the plurality of download time tolerances being based on:
- a context wait time based on an average time the user waited in the past for downloads of one of the plurality of user contexts to the communications device before the user selected another search result after selecting the first search result; or
- a selected wait time for each of the contexts by the user for the user to wait for the search result to open for viewing on the communications device for one of the plurality of user contexts.

\* \* \* \* \*